(12) United States Patent
Szilder

(10) Patent No.: US 6,868,721 B2
(45) Date of Patent: Mar. 22, 2005

(54) MORPHOGENETIC MODELLING OF IN-FLIGHT ICING

(75) Inventor: Krzysztof Szilder, Ottawa (CA)

(73) Assignee: National Research Council Canada, Ottawa (CA)

(*) Notice: Subject to any disclaimer, the term of this patent is extended or adjusted under 35 U.S.C. 154(b) by 0 days.

(21) Appl. No.: 10/454,514

(22) Filed: Jun. 5, 2003

(65) Prior Publication Data

US 2004/0155151 A1 Aug. 12, 2004

Related U.S. Application Data

(60) Provisional application No. 60/385,572, filed on Jun. 5, 2002.

(51) Int. Cl.[7] ............................ G01W 1/10; B64D 15/20
(52) U.S. Cl. ................................. 73/170.26; 244/134 R
(58) Field of Search ................... 73/170.26; 244/134 R, 244/134 F

(56) References Cited

U.S. PATENT DOCUMENTS

| | | | |
|---|---|---|---|
| 4,210,021 A | * | 7/1980 | Vykhodtsev et al. ..... 73/170.26 |
| 4,732,351 A | * | 3/1988 | Bird ....................... 244/134 D |
| 5,195,046 A | | 3/1993 | Gerardi et al. ................. 702/35 |
| 5,585,551 A | * | 12/1996 | Johansson et al. .......... 73/64.53 |
| 6,347,767 B1 | | 2/2002 | Holmen .................... 244/134 F |

FOREIGN PATENT DOCUMENTS

WO   WO 94/20819   9/1994

OTHER PUBLICATIONS

"Simulation of airfoil icing with a novel morphogenetic model", Krzysztof Szilder, pp. 1–8.
"Development of a shallow–water icing model in Fensap–Ice", Y. Bourgault, Journal Of Aircraft, vol. 37, No. 4, Jul.–Aug. 2000, pp. 640–646.
"Experimental and computational simulation of in–flight icing phenomena", R.J. Kind et al., Progress in Aerospace Sciences, 34, 1998, pp. 257–345.

* cited by examiner

*Primary Examiner*—Robert P. Swiatek
(74) *Attorney, Agent, or Firm*—Marks & Clerk; Richard J. Mitchell

(57) ABSTRACT

The accretion of ice on an aerodynamic surface is predicted by identifying predetermined atmospheric parameters relevant to ice formation in a particular fluid environment. Then the behaviour of individual fluid elements is simulated based on the identified parameters to create a model of the ice accretion.

14 Claims, 13 Drawing Sheets

MORPHOGENETIC MODELLING OF IN-FLIGHT ICING

CROSS REFERENCE TO RELATED APPLICATION

This application claims the benefit under 35 USC 119(e) of U.S. Provisional application No. 60/385,572 filed Jun. 5, 2002.

BACKGROUND OF THE INVENTION

1. Field of the Invention

This invention relates to the field of fluid behaviour, and in particular to a method of predicting in-flight icing of aerodynamic surfaces.

2. Description of Related Art

Numerical modelling of the in-flight ice accretion process and its aerodynamic consequences has been performed for several decades to aid in the design of ice protection systems, and in the certification of aircraft for flight in icing conditions. There exists a diversity of advanced two- and three-dimensional icing models that have been developed by various groups in a number of countries (e.g., Bourgault, Y., Beaugendre, H. and Habashi, W. G., 2000. *Development of a shallow-water icing model in FENSAP-ICE*. AIAA Journal of Aircraft, 37, 4: 640–646; Morency, F., Tezok, F. and Paraschivoiu, I., 1999. *Anti-icing system simulation using CANICE*. AIAA Journal of Aircraft, 36, 6: 999–1006; Wright, W. B., 1995. *Users manual for the improved NASA Lewis ice accretion code LEWICE 1.6.* NASA CR-198355).

It is generally accepted that the existing models adequately predict rime ice formation, but that the prediction of glaze icing is still not sufficiently accurate (Kind, R. J., Potapczuk, M. G., Feo, A., Golia, C. and Shah, A. D., 1998. *Experimental and computational simulation of in-flight icing phenomena*. Progress in Aerospace Sciences, 34: 257–345). The icing community feels that only by advancing beyond the control-volume approach, which is used by vast majority of the existing models, can significant further progress be realised in the prediction of glaze icing (Gent, R. W., Dart, N. P. and Cansdale, J. T., 2000. *Aircraft icing*. Phil. Trans. R. Soc. Lond. A, 358: 2873–2911).

SUMMARY OF THE INVENTION

An object of the invention is to overcome the control-volume limitation.

SUMMARY OF THE INVENTION

According to the present invention there is provided a method of predicting icing on an airfoil in a fluid stream, comprising the steps of identifying predetermined macroscopic physical variables relevant to ice formation in a particular fluid environment; calculating the behaviour of individual fluid elements based on said identified macroscopic physical variables taking into account the effect on collision efficiency of non-linear droplet trajectories and the distribution of heat transfer over the airfoil; and predicting ice accretion based on the calculated behaviour of said individual fluid elements.

The invention relies on a novel model, known as a morphogenetic model. In such a model, the behaviour of individual fluid elements is emulated, whereas in prior art icing models, prediction was based on the behaviour of the bulk mass flux of supercooled water droplets. The morphogenetic model is a combination of a particle trajectory model, which determines the trajectory and location of impact of fluid elements, and a random walk model, that predicts their motion, freezing and shedding. The morphogenetic discrete approach attempts to emulate the motion of individual droplets and the generation of a water film on the ice surface, along with subsequent freezing and the formation of a rough ice surface.

A significant feature of this type of model is that it allows the simulation and investigation of the stochastic variability of the accretion shape and mass, something that cannot be achieved with conventional continuous, deterministic models.

In a preferred embodiment, the influence of non-linear droplet trajectories on the local collision efficiency, and the distribution of heat transfer over the icing surface are also taken into account.

A great advantage of the morphogenetic model is that it can be readily adapted to simulate ice accretions forming on objects of complex, time varying geometry, where an analytical approach or even a current numerical approach may not be feasible.

The morphogenetic approach simulates numerically formation of ice accretion on any object exposed to icing conditions (e.g., fixed-wing aircraft, rotorcraft). The time evolution of the distribution of ice thickness is predicted as a function of the following atmospheric parameters: airstream velocity, airstream liquid water content, droplets volume median diameter, altitude and air temperature.

The novel method in accordance with the invention can take into account the variation of local cloud droplet efficiency and local heat transfer around an airfoil surface. It can be conveniently implemented in a computer with the results displayed on a suitable display, such as a computer monitor or printer.

The invention also provides a system for predicting icing on a surface in a fluid stream, comprising:
sensors for measuring predetermined macroscopic physical variables relevant to ice formation in a particular fluid environment;
a processor for calculating the behaviour of individual fluid elements based on said identified macroscopic physical variables taking into account the effect on collision efficiency of non-linear droplet trajectories and the distribution of heat transfer over the airfoil and predicting ice accretion based on the calculated behaviour of said individual fluid elements.

BRIEF DESCRIPTION OF THE DRAWINGS

The invention will now be described in more detail, by way of example only, with reference to the accompanying drawings, in which:

FIG. 3a shows the maximum runback angle, $\alpha_L=0°$; FIG. 3b the runback angle $\alpha_L=50°$, and FIG. 3c shows the runback $\alpha_L=90°$.

FIG. 4 is similar to FIG. 3, but shows the maximum impingement angle $\alpha_M=50°$.

FIG. 5 is similar to FIG. 3, but shows the maximum impingement angle $\alpha_M=30°$.

FIG. 9 shows a comparison between ice accretion shapes predicted by the analytical and morphogenetic models for a runback factor of unity, when all impinging water freezes on impact.

FIG. 10 shows a comparison between ice accretion shapes predicted by the analytical and morphogenetic models for a runback factor of 1.4 and a total water mass of 20 kg m$^{-2}$.

DETAILED DESCRIPTION OF THE PREFERRED EMBODIMENTS

Figure 1:
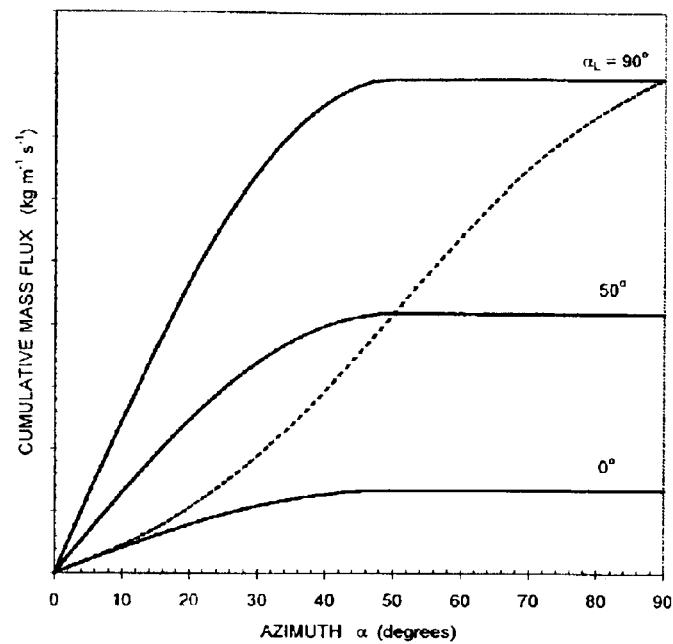
FIG. 1 shows the cumulative impinging (solid) and freezing (dashed) mass fluxes as a function of azimuth for three values of the maximum runback angle, $\alpha_L$. The maximum impingement angle, $\alpha_M$, is 50°.

In the description the following terms are employed:

| | |
|---|---|
| c | chord length (m) |
| Fr | Frössling number |
| h | convective heat transfer coefficient (Wm$^{-2}$K$^{-1}$) |
| $k_A$ | thermal conductivity of air (W m$^{-1}$ K$^{-1}$) |
| $L_F$ | specific latent heat of freezing (J kg$^{-1}$) |
| m | water mass flux along the surface (kg m$^{-1}$ s$^{-1}$) |
| $m_F$ | freezing mass flux (kg m$^{-2}$ s$^{-1}$) |
| $m_W$ | impinging water mass flux (kg m$^{-2}$ s$^{-1}$) |
| $m_T$ | total incoming water mass (kg m$^{-2}$) |
| $M_{Fj}$ | freezing mass flux per unit length (kg m$^{-1}$ s$^{-1}$) |
| $M_{Wvi}$ | impinging water mass flux on a vertical surface segment per unit length (kg m$^{-1}$ s$^{-1}$) |
| Nu | Nusselt number based on chord length |
| $P_n$ | freezing probability |
| $Q_C$ | convective heat flux (W m$^{-2}$) |
| $Q_E$ | evaporative heat flux (W m$^{-2}$) |

-continued

| | |
|---|---|
| Q | external heat flux, Eq. (5) (W m$^{-2}$) |
| Re | Reynolds number based on chord length |
| s | distance from the stagnation line (m) |
| $s_R$ | maximum runback distance (m) |
| S | runback factor |
| t | time (s) |
| $T_A$ | air temperature (K) |
| $T_S$ | surface temperature (K) |
| U | uniform airstream velocity (m s$^{-1}$) |
| W | airstream liquid water content (kg m$^{-3}$) |
| x, y | spatial coordinates (m) |
| α | angle between horizontal and normal to airfoil surface (rad) |
| β | local collision efficiency |
| Δl | grid cell size (m) |
| Δs | average step length measured along the surface (m) |
| — | average value |

Subscripts

| | |
|---|---|
| 0 | stagnation line |
| v | vertical |
| i, j, n, m | indicate location |

In order to exemplify the invention, the formation of ice on a cylindrical object will first be considered. A complementary analytical model will be developed to verify the morphogenetic approach. The analytical model predicts a variety of accretion shapes as a function of a new dimensionless number, which is referred to as the runback factor. The analytical model is based on a conservation of mass equation that assumes the intercepted water mass forms an ice accretion of the shape determined by the heat balance equation, while the remaining unfrozen water is shed.

The objective is to predict the ice shape and mass on the upstream half of a non-rotating cylinder undergoing in-cloud icing. The model will assume wet icing conditions so that there is a surface flow of unfrozen liquid.

Consider the mass conservation equation for water flow over the upstream half of the cylinder, $0 \leq \alpha \leq \frac{1}{2}\pi$, where α is the azimuthal angle measured from the stagnation line, and symmetry above and below the stagnation line is imposed. In order to keep the model simple, assume that once a droplet hits the cylinder surface without splashing, it either freezes or flows downstream along the surface under wind stress. It is further assumed that any unfrozen water is shed from the cylinder at $\alpha = \frac{1}{2}\pi$. The variation of the water mass flux flowing along the cylinder surface is therefore determined by the difference between the impinging water flux and the freezing mass flux:

$$dm = (m_W - m_F) R d\alpha \quad (1)$$

where m is the water mass flux along the cylinder surface (kg m$^{-1}$s$^{-1}$); $m_w$ is the impinging water mass flux (kg m$^{-2}$ s$^{-1}$); $m_F$ is the freezing mass flux (kg m$^{-2}$ s$^{-1}$); and R is the cylinder radius (m).

Non-linear trajectories of uniform size droplets are taken into account by using the following distribution of impinging water mass flux:

$$m_W = U W \beta_O \cos\left(\frac{\pi}{2} \frac{\alpha}{\alpha_M}\right) \quad (2)$$

where U is the uniform airstream velocity (m s$^{-1}$); W is the airstream liquid water content (kg m$^{-3}$); $\beta_O$ is the stagnation line collision efficiency; and $\alpha_M$ is the maximum impingement angle (rad). The latter two parameters, $\beta_O$ and $\alpha_M$, are functions of the airspeed, droplet size and cylinder diameter.

When considering the heat balance for water flowing on the cylinder surface, it is assumed that the sensible and radiative heat fluxes are negligible in comparison with the convective and evaporative fluxes. In addition, analysis shows that for common icing conditions it ma be assumed, as a rough approximation, that the evaporative heat flux, $Q_E$, is about 50% of the convective heat flux, $Q_C$. Consequently:

$$m_F = \frac{1}{L_F}(Q_C + Q_E) \text{ where } Q_E = \frac{1}{2}Q_C \tag{3}$$

and $L_F$ is the specific latent heat of freezing (J kg$^{-1}$).

The azimuthal variation of the convective heat flux is given by the expression:

$$Q_C = Q_O[a - b\cos(c\alpha)]; Q_O = \frac{k_A(T_S - T_A)}{2R} Re^{0.5} \tag{4}$$

Here the coefficients a=2.4, b=1.2, and c=3.6; $k_A$ is the thermal conductivity of air (W m$^{-1}$K$^{-1}$); $T_S$ is the surface temperature (K); $T_A$ is the air temperature (K); and Re is the cylinder Reynolds number.

Using Eqs. (2–4) and integrating Eq. (1) from the stagnation line, the following expressions are obtained for the water mass flux:

$$m(\alpha) = \frac{2}{\pi} U W \beta_O R \alpha_M \sin\left(\frac{\pi \alpha}{2 \alpha_M}\right) - \tag{5a}$$

$$\frac{3Q_O R}{2L_F}\left[a\alpha - \frac{b}{c}\sin(c\alpha)\right] \text{ for } 0 \leq \alpha \leq \alpha_M$$

$$m(\alpha) = \frac{2}{\pi} U W \beta_O R \alpha_M - \tag{5b}$$

$$\frac{3Q_O R}{2 L_F}\left[a\alpha - \frac{b}{c}\sin(c\alpha)\right] \text{ for } \alpha_M \leq \alpha \leq \frac{\pi}{2}$$

FIG. 1 shows the various regimes that are determined by the relation between the impingement and freezing terms in Eq. (5). The location where water stops flowing on the surface is given by the maximum runback angle, $\alpha_L$. It may be determined simply from Eq. (5) by solving $m(\alpha_L)=0$. The dotted line gives the potential cumulative ice mass, based on the heat transfer, formed between the stagnation line and the location $\alpha$. The actual ice mass is clearly limited by the impinging water mass, so the former cannot exceed the latter. When the potential ice mass is less than the impinging water mass, the difference between the curves describing the cumulative impinging water mass and the line describing the cumulative ice mass is the runback liquid mass flux at that location.

Ultimately, the shape of the resulting ice accretion is determined, in part at least, by the extent of the runback. In order to quantify this effect, we therefore define a dimensionless runback factor, S, as the ratio of the impinging mass flux to the freezing mass flux at the stagnation line:

$$S = \frac{m_W(\alpha = 0)}{m_F(\alpha = 0)} = \frac{2 U W \beta_O L_F}{3 Q_O (a - b)} \tag{6}$$

When $0 < S \leq 1$, all impinging water freezes on impact and there is no surface flow of unfrozen liquid. When S>1, unfrozen water flows downstream from the stagnation line. The meaning of S may be interpreted from FIG. 1. It is the ratio of the slopes of the solid and dashed lines at $\alpha=0°$. For a maximum runback angle, $\alpha_L$, of 0°, there is no water flow on the ice surface and the runback factor, S, is unity. For maximum water flow angles of 50°, and 90°, the runback factor is 3.14 and 5.95, respectively.

We now seek a general relation between $\alpha_L$, $\alpha_M$, and S. Using Eq. (5) with the condition $m(\alpha_L)=0$, and utilising Eq. (6), we obtain:

$$S = \frac{a\alpha_L - \frac{b}{c}\sin(c\alpha_L)}{\frac{2}{\pi}\alpha_M(a-b)\sin\left(\frac{\pi}{2}\frac{\alpha_L}{\alpha_M}\right)} \text{ for } 0 \leq \alpha_L \leq \alpha_M \tag{7a}$$

$$S = \frac{a\alpha_L - \frac{b}{c}\sin(c\alpha_L)}{\frac{2}{\pi}\alpha_M(a-b)} \text{ for } \alpha_M \leq \alpha_L \leq \frac{\pi}{2} \tag{7b}$$

Figure 2:
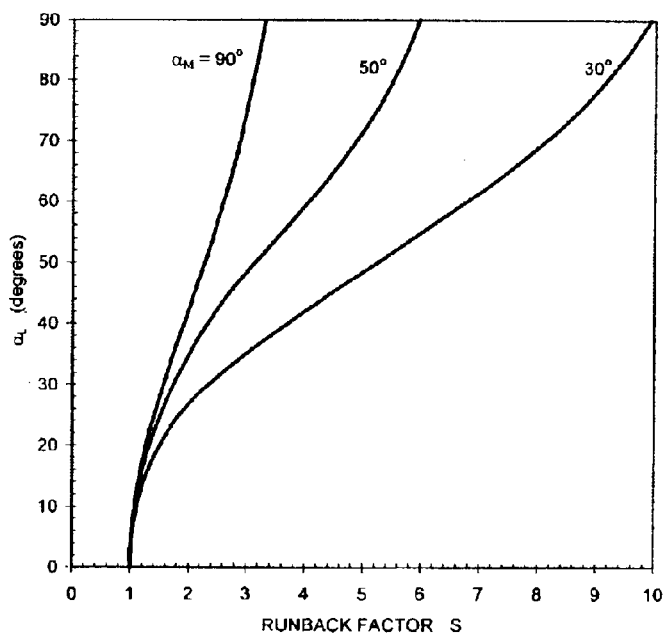
FIG. 2 shows the maximum runback angle, $\alpha_L$, as a function of the runback factor, S, for three values of the maximum impingement angle, $\alpha_M$.

FIG. 2 illustrates Eq. (7) graphically. An increase of the runback factor, arising from either a decreasing convective heat flux or an increasing impinging water flux at the stagnation line, leads to downstream displacement of the maximum runback point. As the maximum impingement angle decreases, while the runback factor is kept constant, the region of liquid flow also diminishes, since the total mass of impinging water is decreasing.

The total water mass impinging in the vicinity of the stagnation line, $m_O$ (kg m$^{-2}$), is given by:

$$m_O = UW\beta_O t \tag{8}$$

where t is the duration of the icing event (s).

We now seek an expression for the total mass intercepted by the cylinder, $m_{TW}$, (kg m$^{-1}$). Integrating Eq. (2) along the cylinder surface between the lower and upper maximum impingement azimuths, and using Eq. (8), gives:

$$m_{TW} = \int_{-\alpha_M}^{\alpha_M} m_W t R \, d\alpha = \frac{4}{\pi} m_O R \alpha_M \tag{9}$$

The total potential mass of ice accretion, $m_{TF}$ (kg m$^{-1}$), that would form if there were an unlimited supply of water may be expressed as a function of the runback factor. Integrating the freezing mass rate, expressed by Eq. (3–4), along the front part of the cylinder and using Eq. (6) and (8) leads to:

$$m_{TF} = \int_{-0.5\pi}^{-0.5\pi} m_F t R d\alpha = \frac{2 m_O R}{S(a-b)}\left[a\frac{\pi}{2} - \frac{b}{c}\sin\left(c\frac{\pi}{2}\right)\right] \tag{10}$$

It should be kept in mind that the above analysis is valid only during the initial stages of ice formation on a cylinder, since we have implicitly assumed that the impinging flux and the freezing flux do not change with time or with the evolving geometry of the accreting ice, Eq. (1).

Since the validity of the analytical model is limited to the early stages of the ice growth when the newly formed ice accretion does not appreciably alter the cylindrical geometry, we will demonstrate that the morphogenetic model can be used to extend the simulations to longer icing events. In principle, the morphogenetic model predicts and accounts for the time evolution of the accretion shape. It is also particularly useful when simulating ice accretion on substrates of complex geometry, such as engine inlets and turbines. For simplicity, the morphogenetic model is constrained so that there is no recalculation of the airflow or the droplet trajectories during the ice growth. However, the model can incorporate time-dependent variation of the airflow around the evolving ice accretion and the consequent alteration of the droplet trajectories.

The morphogenetic model is a combination of a particle trajectory model, which determines the interception and impact location of fluid elements, and a random walk model, that emulates their motion and freezing along the substrate or ice surface. The model fluid elements may be imagined to consist of an ensemble of cloud droplets. A two-dimensional rectangular lattice defines the accretion domain.

We use a simple parameterisation for the local collision efficiency as a function of azimuthal angle:

$$\beta_i = \beta_O \cos\left(\frac{\pi}{2}\frac{\alpha_i}{\alpha_M}\right) \quad (11)$$

Using this parameterisation, the fluid elements are placed randomly on the cylinder surface or on the existing ice structure, in such a way that their distribution accords with Equation (11). For now, it is also assumed that this parameterisation remains valid during the entire ice growth process. Consequently, this embodiment of the model is strictly applicable only when the accreted ice does not appreciably change the airflow and droplet trajectories. This restriction can however be relaxed by changing the model.

A fluid element begins its stochastic motion downstream along the surface, from its initial random impact location. At each step in the process, a random number is generated, and, according to its value, the element either freezes, moves downstream along the surface, or is shed once it reaches an azimuth of 90°. The model is sequential, so that as soon as a particular fluid element freezes or is shed from the structure, the behaviour of the next element is considered. Account is taken of the effect on collision efficiency of non-linear droplet trajectories, and allowing an azimuthal distribution of the heat transfer to the airstream. We will now derive a relation for the freezing probability as a function of the controlling macroscopic physical variables.

We consider the $n^{th}$ lattice site measured downstream from the stagnation line along the discretized cylinder or accretion surface. We consider that the mass flux of impinging water on a vertical surface segment, per unit length of the cylinder, $M_{WVi}$ (kg s$^{-1}$m$^{-1}$), decreases from its impingement angle, $\alpha_M$. In addition, we take the impinging mass flux to be zero on horizontal surface segments, and also downstream from the maximum impingement angle. The freezing rate per unit length, $M_{Fj}$ (kg s$^{-1}$m$^{-1}$), on the other hand, varies with location, and freezing may occur both on horizontal and vertical surface segments. Consequently, the mass of water entering the $n^{th}$ site is given by the difference between the total upstream impinging water mass, $$\sum_{i=1}^{m} M_{WVi},$$

(where "m" is the number of upstream vertical surface segments), and the total mass frozen upstream, $$\sum_{j=1}^{n-1} M_{Fj}.$$

It should be noted that m≦n, because the discrete approximation of the cylinder or accretion surface by the boundaries of square grid cells, produces a staircase surface profile, with some grid sites where fluid elements cannot impinge directly (e.g. horizontal surface segments). Since the freezing rate at the $n^{th}$ site is $M_{Fn}$, we set the freezing probability equal to the ratio of the mass frozen at site "n" to the incoming liquid mass at the site:

$$P_n = \frac{M_{Fn}}{\sum_{i=1}^{m} M_{WVi} - \sum_{j=1}^{n-1} M_{Fj}} \quad (12)$$

The morphogenetic model values of $M_{WVi}$ and $M_{Fi}$ may be related to the physical value of the impinging water mass flux on vertical surfaces, $m_{WVi}$, and the freezing rate, $m_{Fj}$, as follows:

$$M_{WVi}=m_{WVi}\Delta l \quad M_{Fj}=m_{Fj}\Delta s \quad (13)$$

where $m_{WVi}$ is related to the impinging water mass flux according to $m_{Wi}=m_{WVi}\cos(\alpha_i)$. The dimension $\Delta l$ is the grid cell size and $\Delta s$ is the average step length measured along the surface. The relation between these two quantities is $\Delta s=0.25\ \pi\Delta l$. Substituting the expressions from Eq. (13) into Eq. (12) gives a relation for the freezing probability at location "n":

$$P_n = \frac{1}{\frac{4}{\pi}\sum_{i=1}^{m} S_{i,n} - S_{1,n}\sum_{j=1}^{n-1}\frac{1}{S_{1,j}}} \quad (14)$$

where $S_{i,j} = \frac{m_{WVi}}{m_{Fj}}; n = 1, 2, \ldots, n_t; m \leq n$ where $n_t$ is the total number of sites measured along the actual surface from the stagnation line to the shedding location ($n_t$=2 R $\Delta l^{-1}$ for a bare cylinder). The local runback factor, $S_{i,j}$ may be expressed using Eqs. (2–4) and (6) as a function of the runback factor (at the stagnation line) and the azimuth:

$$S_{i,j} = \frac{U W \beta_O \dfrac{\cos\left(\frac{\pi}{2}\frac{\alpha_i}{\alpha_M}\right)}{\cos(\alpha_i)}}{\dfrac{3Q_O}{2L_F}[a - b\cos(c\,\alpha_j)]} \quad (15)$$

$$= S\frac{\cos\left(\frac{\pi}{2}\frac{\alpha_i}{\alpha_M}\right)}{\cos(\alpha_i)}\frac{a-b}{a-b\cos(c\,\alpha_j)}$$

Simulations of fluid element motion and freezing or shedding are performed consecutively for the total number of fluid elements determined by the specified total intercepted mass flux. Prior to launching a new fluid element, the distribution of the freezing probability along the evolving surface (as $n_t$ increases) is recalculated using Eq. (14) and (15). In order to accomplish this task, the accretion is divided into upper and lower sections by a horizontal plane passing through the cylinder centre, and the distribution of the freezing probability is calculated separately for each side. This recalculation of the distribution of freezing probability, prior to considering the motion of the next fluid element, allows the effect of the changing accretion shape on the runback and freezing processes to be taken into account.

Each fluid element ends its motion either by freezing or by shedding. When a fluid element freezes, a "cradle" location is sought in the neighbourhood of the freezing grid cell, and this cradle location becomes the final resting place of the frozen element. This neighbourhood is a square centred on the freezing grid cell with a side length of 9Δl. Any unfrozen fluid elements are shed from the cylinder when they reach an azimuthal angle of ±90° from the stagnation line.

The analysis of the analytical model allows identification of the following three governing parameters: the runback factor, S, the maximum impingement angle, $\alpha_M$, and the total water mass impinging in the vicinity of the stagnation line, $m_O$. However, Eq. (7) shows that S, $\alpha_M$, and $\alpha_L$ are correlated, and hence we may replace the runback factor, S, with the maximum runback angle, $\alpha_L$, and analyse the icing process as a function of $\alpha_L$, $\alpha_M$ and $m_O$. On the one hand, the choice of S as the governing parameter seems to be more physically correct, since S is related directly to the physical parameters, Eq. (6). On the other hand, $\alpha_L$ has an obvious visual interpretation. Consequently, we will use either or both parameters as the need arises.

Figure 4A:
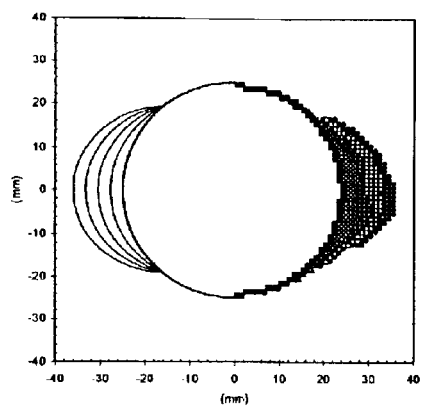
FIG. 4a shows a maximum runback angle, $\alpha_L=0°$.
Figure 4B:
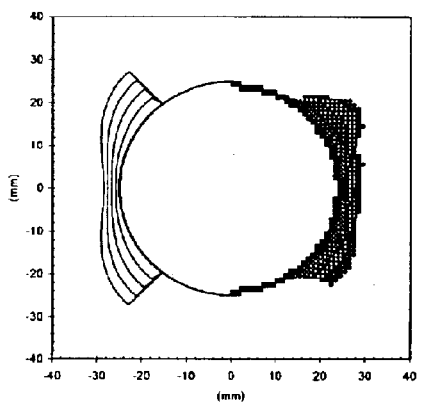
FIG. 4(b) shows a maximum runback angle $\alpha_L=50°$.
Figure 4C:
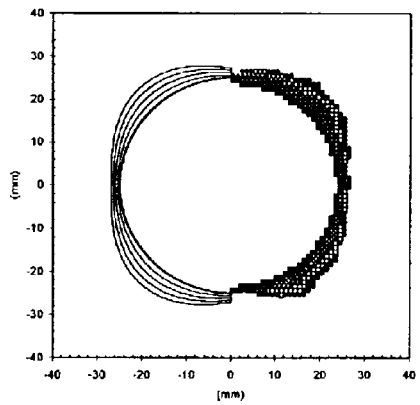
FIG. 4(c) shows a runback angle $\alpha_L=90°$.
Figure 5A:
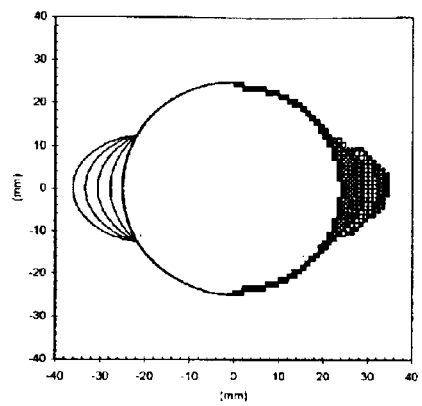
FIG. 5a shows the maximum runback angle, $\alpha_L=0°$.
Figure 5B:
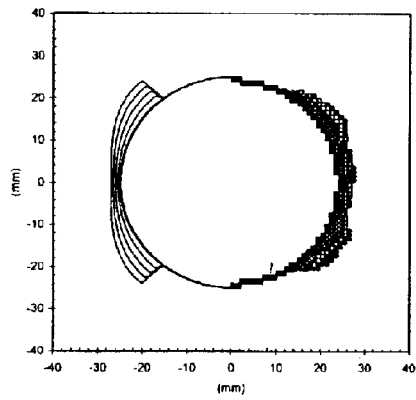
FIG. 5b shows the runback angle $\alpha_L=50°$.
Figure 5C:
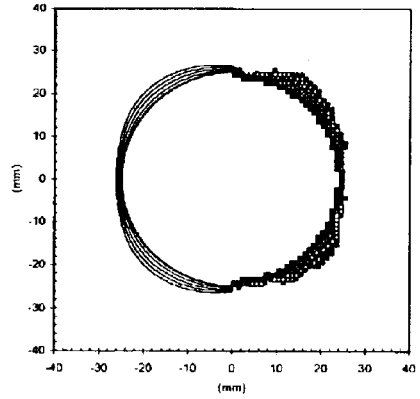
FIG. 5c shows the runback angle $\alpha_L=90°$.

The ice shapes predicted by the analytical and morphogenetic models are presented in FIGS. 3, 4, and 5, side by side, for the same values of the governing parameters. The following values have been chosen to illustrate the range of possible conditions: $\alpha_M$=90°, 50°, and 30°; $\alpha_L$=0°, 50°, and 90° (with appropriately varying S); and $m_O$=2.5, 5.0, 7.5, 10 kg m$^{-2}$. We examine the accretion on a cylinder of radius 25 mm, and an ice density of 900 kg m$^{-3}$ is assumed, consistent with glaze icing. The morphogenetic model simulations are performed on a two-dimensional lattice with a grid size, Δl, of 1 mm, consisting of 40 (horizontal) by 80 (vertical) cells. The total incoming water mass is divided into a set of fluid elements, each occupying 1 mm$^2$ after freezing. Four different symbols are used to distinguish consecutive ice layers predicted by the morphogenctic model.

FIG. 3 shows results for horizontal, straight line droplet trajectories, $\alpha_M$=90°, and for three values of the maximum runback angle 0°, 50°, and 90°, which correspond to runback factors of 1.00, 2.28, and 3.30, respectively (see FIG. 2). Four consecutive ice layers are distinguished, each corresponding to $m_O$=2.5 kg m$^{-2}$ of water mass impinging in the vicinity of the stagnation line. The maximum impingement angle, $\alpha_M$, is 90° and the cylinder radius, R, is 25 mm. The solid squares represent the cylinder surface in the morphogenetic model.

Figure 3A:
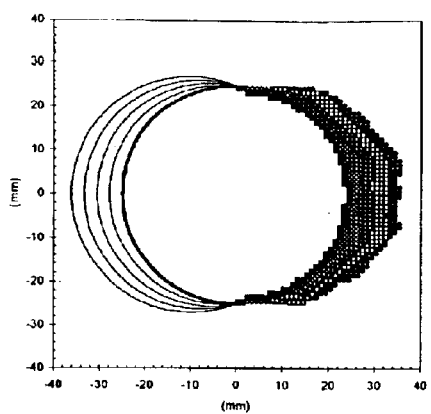
FIGS. 3a to 3c show a comparison between the ice accretion shapes predicted by the analytical (left-hand side) and morphogenetic (right-hand side) models.
Figure 6:
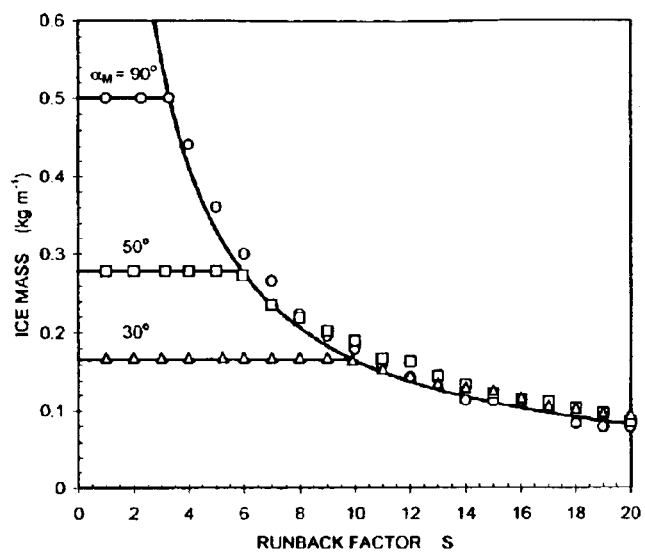
FIG. 6 shows the influence of the runback factor, S, on the ice mass predicted by the morphogenetic model (depicted by points), for three values of the maximum impingement angle, $\alpha_M$.

FIG. 3a shows the results when cloud droplets freeze instantly upon impingement, $\alpha_L$=0°. The results of the analytical model are based on Eq. (2) and it is assumed that the ice grows radially. In this particular case, the radial growth assumption leads to rather unrealistic ice shapes, characterised by varying vertical cross-sections and increasing horizontal dimensions. On the contrary, the ice should grow only forward with constant vertical cross-section. The morphogenetic model prediction shows these expected ice growth characteristics. The morphogenetic model also displays random features of the ice structure such as the lack of perfect symmetry about the horizontal surface passing through the cylinder centre. The total ice mass predicted by the analytical and morphogenetic models is shown as a function of the runback factor in FIG. 6, where the solid horizontal lines correspond to the total mass intercepted by the cylinder as predicted by the analytical model, Eq. (9). The solid curve represents the maximum potential ice mass predicted by the analytical heat balance equation, Eq. (10). The total water mass impinging in the vicinity of the stagnation line, $m_O$=10 kg m$^{-2}$, and the cylinder radius, R=25 mm. The mass obtained by the morphogenetic model (point for S=1) agrees with the analytically calculated intercepted mass (horizontal line).

Figure 3B:
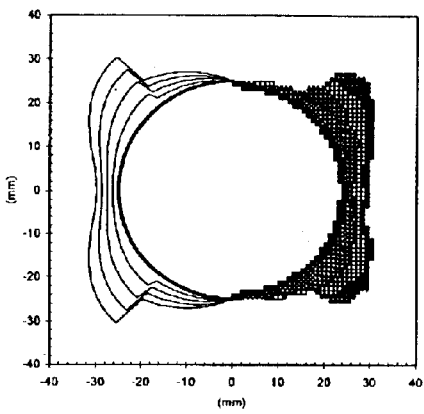

FIG. 3b shows results for a maximum runback angle of 50° corresponding to a runback factor of 2.28. In this case, unfrozen water flows from the stagnation line to an azimuth of 50° on the upper and lower cylinder surface. Consequently, in this region, the analytical distribution of the ice thickness is determined by the heat balance formulation, and the ice thickness follows the azimuthal angular dependence of the first part of Eq. (4). There is a discontinuity at the maximum runback location, since downstream from this point, the impinging droplets freeze instantly and the ice growth is determined by Eq. (2). Since in the analytical model the ice shape calculations are based on the initial growth rate, the model predicts unrealistic ice formation behind the ice horns. The ice growth there should diminish with time due to the shadowing effect of the horns. The morphogenetic model properly simulates this time-dependent shadowing effect. Moreover, the overall ice shape predicted by the morphogenetic model agrees well with the analytical model prediction.

Figure 3C:
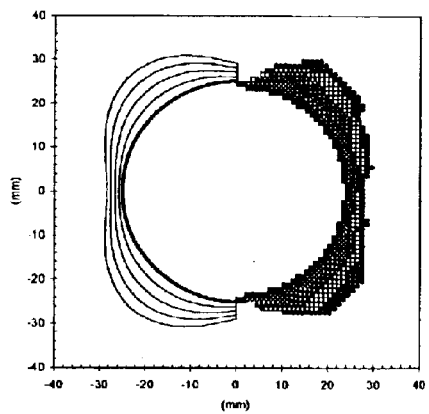

Results for the critical case, when unfrozen water flows over the entire upstream half of the cylinder, and freezes at $\alpha$=±90°, are shown in FIG. 3c. Here, the analytical model prediction is solely determined by the heat balance equation. The morphogenetic model gives, overall, a similar ice thickness distribution, but, due to the shadowing effect, there is less ice forming near $\alpha$=±90°. When the runback factor is less than the critical value of 3.30, the total ice mass is independent of the runback factor, since there is no water shedding. However, greater values of the runback factor lead to water shedding at $\alpha$=±90° and the ice mass then decreases with increasing runback factor, FIG. 6. It is apparent that the ice mass predicted by the two models is approximately the same. The stochastic variability of the morphogenetic model's prediction is due to its inherent randomness.

We now consider cases where the maximum impingement angle is 50°, FIG. 4. The water mass impinging in the vicinity of the stagnation line, $m_O$, is assumed to be the same as for the cases of FIG. 3, but the total impinging mass on the cylinder is smaller by 44.4%, Eq. (9), FIG. 6. When the maximum runback angle, $\alpha_L$, is 0° (corresponding to S=1.00), there is no water flow on the surface and the two models predict similar ice shapes, FIG. 4a. An increase of $\alpha_L$ to 50° (corresponding to S=3.14), FIG. 4b, leads to water flow on the surface, and the analytical model predicts horns with abrupt edges. The morphogenetic model predicts a similar accretion shape, but with less pronounced horns. When the maximum runback angle is 90° (corresponding to S=5.95), FIG. 4c, the ice shapes predicted by the two models are quite similar.

FIG. 5 shows model results for a maximum impingement angle of 30°. Values of the maximum runback angle of 0°, 50°, and 90°, correspond to runback factors of 1.00, 5.24, and 9.91, respectively. As before, there is overall agreement between the accretion shapes predicted by the two models, with differences similar to those discussed in the analysis of FIG. 4. When water is not shed from the cylinder, the total ice mass remains constant, but it decreases with decreasing $\alpha_M$, FIG. 6. When water is shed, the ice mass is not a function of the maximum impingement angle, but is instead determined by the integrated heat flux, Eq. (10).

The morphogenetic model simulates ice accretion on a cylinder in good agreement with the analytical model. The morphogenetic model is able to account for the influence of non-linear droplet trajectories and the spatial distribution of the heat transfer. The advantage of the morphogenetic model is that it can simulate not only the initial ice growth, like the analytical model, but it can also handle the evolution of the accretion shape. In addition, the power of the morphogenetic model is that it is not limited to simple geometries.

In second embodiment, the morphogenetic model will now be considered in relation to an airflow, and in particular an NACA 0012 airfoil undergoing in-cloud icing. We will make a number of simplifying assumptions, some of which have a larger impact on the accuracy of the simulation, in the interest of achieving an analytical solution. We begin by considering the mass conservation equation for the liquid film flow over the airfoil. We assume that the angle of attack is zero and consequently symmetry above and below the stagnation line is imposed. To further simplify the model, we assume that once a droplet hits the airfoil surface without splashing, part of it may freeze in situ and part will flow downstream along the surface under wind stress, where further freezing may occur. The variation of the water mass flux flowing along the airfoil surface is therefore determined by the difference between the impinging water flux and the freezing mass flux:

$$dm = m_W ds - m_F ds \quad (16)$$

The locally impinging water flux is calculated using the relation:

$$m_W = UW\beta(s) \quad (17)$$

The local collision efficiency was numerically determined for a NACA 0012 airfoil with chord length of 0.9144 m, airstream velocity of 44.7 m s$^{-1}$, and median volumetric droplet diameter of 20 $\mu$m.

When considering the heat balance for water flowing on the airfoil surface, we assume that the sensible and radiative heat fluxes are negligible in comparison with the convective and evaporative fluxes. In addition, a simple analysis shows that for some common icing conditions, it may be assumed, as a rough approximation, that the evaporative heat flux is about 50% of the convective heat flux. Consequently, we take:

$$m_F = \frac{1}{L_F}(Q_C + Q_E) \text{ where } Q_E = \frac{1}{2}Q_C \quad (18)$$

The distribution of the convective heat flux along the airfoil may be expressed in terms of the Frössling number which is related to the Nusselt and Reynolds numbers:

$$Fr = \frac{Nu}{\sqrt{Re}} \text{ and } Nu = \frac{hc}{k_A} \quad (19)$$

Consequently:

$$m_F = \frac{3}{2}\frac{Q}{L_F}Fr(s); Q = \frac{k_A(T_S - T_A)}{c}\sqrt{Re} \quad (20)$$

Three distributions of the Frössling number are considered: constant Frössling number; smooth airfoil surface; rough airfoil surface. The corresponding experimental distributions may be approximated, respectively, by the following relations:

$$Fr = 4.5 \quad (21)$$
$$Fr = 4.5e^{-35s}$$
$$Fr = \begin{cases} 4.5 + 125\,s & \text{when } 0 \le s < 0.02m \\ 7.0 + e^{-28(s-0.02)} & \text{when } s \ge 0.02m \end{cases}$$

Using Eqs. (17) and (20) and integrating Eq. 16 from the stagnation line, we obtain the following expressions for the water mass flux:

$$m(s) = UW\int_0^s \beta(s)ds - \frac{3Q}{2L_F}\int_0^s Fr(s)ds \quad (22)$$

Figure 7:
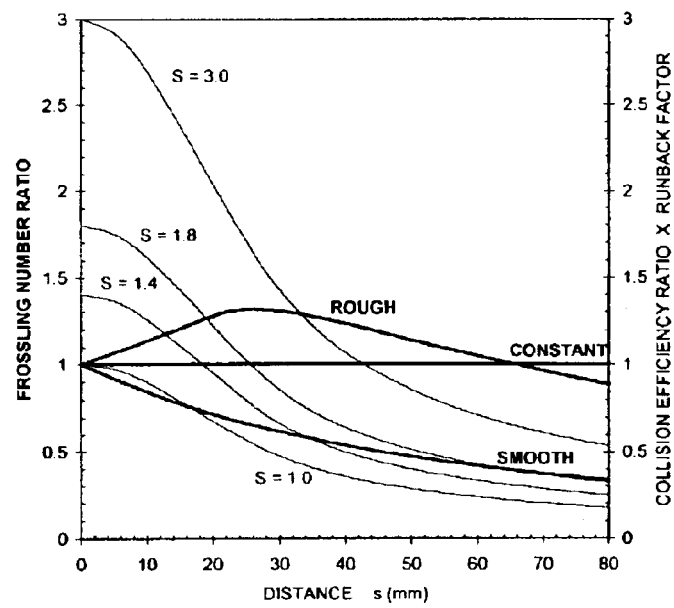
FIG. 7 shows the Frössling number ratio for three different heat transfer conditions (thick curves) and collision efficiency ratio multiplied by the four indicated values of the runback factor (thin curves) as a function of distance from the stagnation line of a NACA 0012 airfoil (see Eq. (24)).

Ultimately, the shape of the resulting ice accretion is determined, in part at least, by the extent of the runback. In order to quantify this effect, we define a dimensionless runback factor as the ratio of the impinging mass flux to the freezing mass flux at the stagnation line:

$$S = \frac{m_W(s=0)}{m_F(s=0)} = \frac{2UW\beta_0 L_F}{3QFr_0} \quad (23)$$

where $\beta_0$ and $Fr_0$ are respectively the local collision efficiency and the Frössling number at the stagnation line. When $0 < S \le 1$, all impinging water freezes on impact at the stagnation line. When $S > 1$, unfrozen water flows downstream from the stagnation line. Using the definition of the runback factor, Equation (22) may be rewritten:

$$m(s) = \frac{3Q}{2L_F}Fr_0 s\left[S\frac{\bar{\beta}(s)}{\beta_0} - \frac{\overline{Fr}(s)}{Fr_0}\right] \quad (24)$$

where $\bar{\beta}(s)$ is the average collection efficiency and $\overline{Fr}(s)$ is the average Frössling number, both averaged over the airfoil surface from the stagnation line to the point s. FIG. 7 displays the variation along the airfoil surface of the two dimensionless terms in brackets in Eq. (24): first, the product of the runback factor and the collision efficiency ratio and second, the Frössling number ratio. When the first term exceeds the second, water flows along the airfoil surface. At the point where the curves intersect, water flow stops. We call this location the maximum runback distance, $s_R$.

We now seek a general relation between the maximum runback distance and the runback factor, for the three assumed Frössling number distributions. Using Eq. (24) with the condition $m(s_R) = 0$, we obtain:

$$S\frac{\bar{\beta}(s_R)}{\beta_0} = \frac{\overline{Fr}(s_R)}{Fr_0} \quad (25)$$

Figure 8:
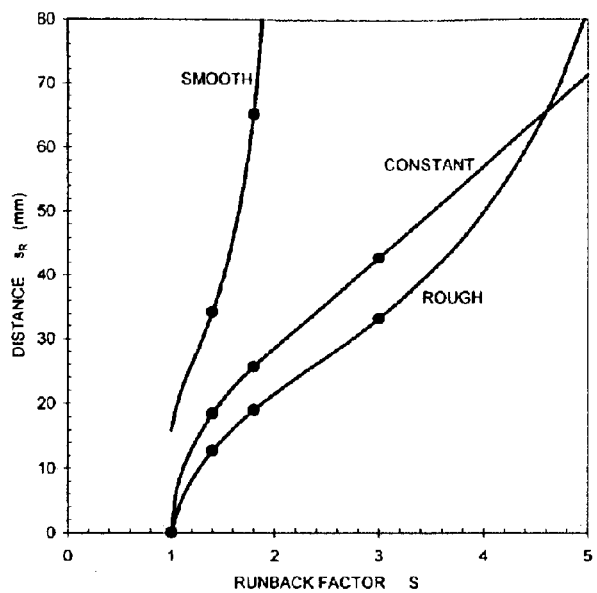
FIG. 8 shows the maximum runback distance as a function of the runback factor for three distributions of the Frössling number. The circles correspond to the cases examined in FIGS. 9, 10, 11 and 12.

FIG. 8 illustrates the solution of Eq. (25) graphically. An increase of the runback factor, arising from either a decreasing convective heat flux or an increasing impinging water flux at the stagnation line, leads to downstream displacement of the maximum runback location. For the smooth surface formulation, when the runback factor is equal to unity, all impinging droplets freeze at the stagnation line, but there is not enough heat removed between the stagnation line and the location 16 mm downstream, and consequently, water flows within this region (see also FIG. 7). In addition, since the smooth surface is characterised by the least efficient heat exchange, the maximum runback location moves rapidly away from the stagnation line as the runback factor increases. For a runback factor less than 4.6, the extent of the liquid flow is a minimum for the rough case. However, for very wet cases characterised by high values of the runback factor, $S > 4.6$, the maximum runback distance is a minimum for the constant Frössling number case.

Finally, we define the "total incoming water mass", $m_T$ (kg m$^{-2}$) to be:

$$m_T = UWt \quad (26)$$

This is the maximum possible impinging water mass, which would prevail if β were unity everywhere.

It should be kept in mind that the above analysis is valid only during the initial stages of ice formation on an airfoil, since we have implicitly assumed that the impinging flux and the freezing flux do not change with time or with the evolving geometry of the accreting ice, Eq. (16).

The airflow around the airfoil and the droplet trajectories have not actually been calculated. Instead, a simple parameterisation is used for the local collision efficiency as a function of distance from the stagnation line measured along the airfoil:

$$\beta_i = \beta(s_i) \tag{27}$$

The fluid elements impact randomly on the airfoil surface or on the existing ice structure, in such a way that their distribution accords with Equation (27). For now, it is further assumed that this parameterisation remains valid during the entire ice growth process. Consequently, the model in its present form is strictly applicable, only when the accreted ice does not appreciably change the airflow and droplet trajectories. This condition, too, will be relaxed in future versions of the model.

A fluid element begins its stochastic motion downstream along the surface, from its initial random impact location. At each step in the process, a random number is generated, and, according to its value, the element either freezes or moves downstream along the surface. The model is sequential, so that as soon as a particular fluid element freezes, the behaviour of the next element is considered. We will now derive a relation for the freezing probability as a function of the controlling macroscopic physical variables. Here we recall that the angle of attack is taken to be zero, and the free stream velocity is assumed to be horizontal.

We examine the $n^{th}$ lattice site measured downstream from the stagnation line along the discretized airfoil or accretion surface. We consider that the mass flux of impinging water on a vertical surface segment, per unit length of the airfoil, $M_{WVi}$, decreases from its maximum value at the stagnation line to zero. In addition, we take the impinging mass flux to be zero on horizontal surface segments, and also on all segments downstream from the maximum impingement location. The freezing rate per unit length, $M_{Fj}$, varies with location, and freezing may occur both on horizontal and vertical surface segments. Consequently, the mass of water entering the $n^{th}$ site is given by the difference between the total upstream impinging water mass, $$\sum_{i=1}^{m} M_{WVi},$$

(where "m" is the number of upstream vertical surface segments), and the total mass frozen upstream, $$\sum_{j=1}^{n-1} M_{Fj}.$$

It should be noted that m≤n, because the discrete approximation of the airfoil or accretion surface by the boundaries of square grid cells, produces a staircase surface profile, with some grid sites where fluid elements cannot impinge directly (e.g. horizontal surface segments). Since the freezing rate at the $n^{th}$ site is $M_{Fn}$, we set the freezing probability equal to the ratio of the mass frozen at site "n" to the incoming liquid mass at the site:

$$P_n = \frac{M_{Fn}}{\sum_{i=1}^{m} M_{WVi} - \sum_{j=1}^{n-1} M_{Fj}} \tag{28}$$

The morphogenetic model values of $M_{WVi}$ and $M_{Fi}$ may be related to the physical value of the impinging water mass flux on vertical surfaces, $m_{WVi}$, and the freezing rate, $m_{Fj}$, as follows:

$$M_{WVi} = m_{WVi} \Delta l; \; M_{Fi} = m_{Fi} \Delta s \tag{29}$$

where $m_{WVi}$ is related to the impinging water mass flux according to $m_{Wi} = m_{WVi} \cos(\alpha_i)$ where $\alpha_i$ is the angle between direction of the mean impingement and the normal to the airfoil surface. The dimension $\Delta l$ is the grid cell size and $\Delta s$ is the average step length measured along the surface. The relation between these two quantities is $\Delta l = 1.27 \Delta s$. Substituting the expressions from Eq. (29) into Eq. (28) gives a relation for the freezing probability at location "n":

$$P_n = \frac{1}{1.27 \sum_{i=1}^{m} S_{i,n} - S_{1,n} \sum_{j=1}^{n-1} \frac{1}{S_{1,j}}} \text{ where} \tag{30}$$

$$S_{i,j} = \frac{m_{WVi}}{m_{Fj}}; \; n = 1, 2, \ldots, n_t; m \leq n$$

where $n_t$ is the total number of segments measured along the discrete airfoil surface, from the stagnation line to the edge of the domain. The local runback factor, $S_{i,j}$, may be expressed using Eqs. 17 and 20 as a function of location and the runback factor at the stagnation line:

$$S_{ij} = \frac{UW \frac{\beta(s_i)}{\cos(\alpha_i)}}{\frac{3Q}{2L_F} Fr(s_j)} = S \frac{\frac{\beta(s_i)}{\beta_0} \frac{1}{\cos(\alpha_i)}}{\frac{Fr(s_j)}{Fr_0}} \tag{31}$$

Simulations of fluid element motion and freezing are performed consecutively for the total number of fluid elements determined by the specified total intercepted mass flux. Prior to launching a new fluid element, the distribution of the freezing probability along the evolving surface is recalculated using Eq. (30 and (31). In order to accomplish this task, the accretion is divided into upper and lower sections, and the distribution of the freezing probability is calculated separately for each side. This recalculation of the distribution of freezing probability, prior to considering the motion of the next fluid element, allows the effect of the changing accretion shape on the runback and freezing processes to be taken into account.

Each fluid element ends its motion either by freezing or by leaving the domain, while still in a liquid state. When a fluid element freezes, a "cradle" location is sought in the neighbourhood of the freezing grid cell. This neighbourhood is a square centred on the initially determined freezing point with side equal to $9\Delta l^{(10)}$. The freezing fluid element is moved to the empty cell within this area where it will have the maximum number of occupied neighbours. If there is more than one such location, the final site is chosen randomly from among them.

The influence of the determining parameters on the accretion process, as predicted by the analytical and morphogenetic models for an airfoil section will now be discussed. The analysis will be performed as a function of the runback factor, assuming three heat transfer formulations: constant Frössling number, smooth airfoil surface, and rough airfoil surface. The governing equations for those three cases are given by Eq. (21).

The ice accretion on a NACA 0012 airfoil with 0.9144 m chord length will be examined. The ice shapes predicted by the analytical and morphogenetic models are presented for a total incoming water mass of 5, 10, 15 and 20 kg m$^2$; Different shading is used to distinguish the four consecutive ice layers predicted by the morphogenetic model. An ice density of 900 kg m$^{-3}$ is assumed, consistent with glaze icing. The morphogenetic model simulations are performed on a two-dimensional lattice with a grid size, $\Delta l$, of 0.5 mm, consisting of 200 by 200 cells. The total incoming water mass is divided into a set of fluid-elements, each occupying 0.25 mm$^2$ after freezing.

FIG. 9 shows ice shapes predicted by the analytical and morphogenetic models, assuming that all impinging liquid freezes on impact. This situation corresponds to a runback factor less than or equal to unity. In addition, the heat removed from the ice surface downstream from the stagnation line is large enough for instantaneous droplet freezing. The results of the analytical model are based on Eq. (17), where we assume that the ice growth direction is perpendicular to the airfoil surface. While Eq. (17) is, strictly speaking, valid only at the initial time, it is applied for the entire duration of the icing event. This assumption leads to an overestimation of the ice accretion size since the ice surface area increases during the ice growth, while the impingement limits are kept fixed.

Figure 9A:
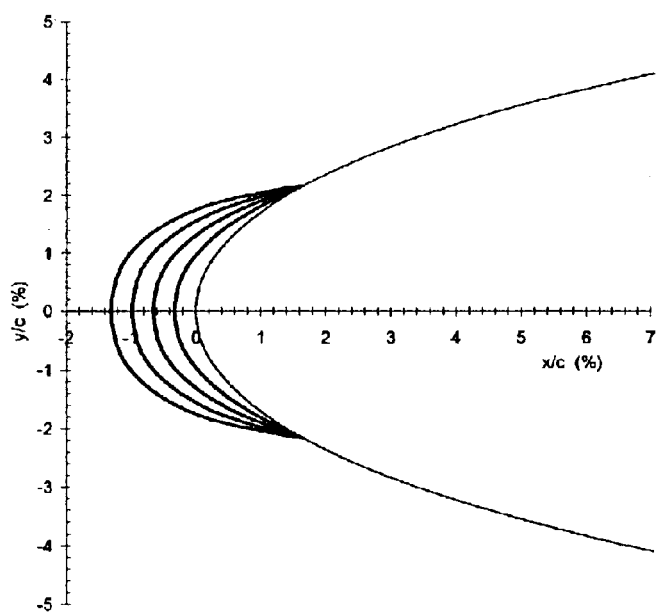
FIG. 9a shows the analytical model.
Figure 9B:
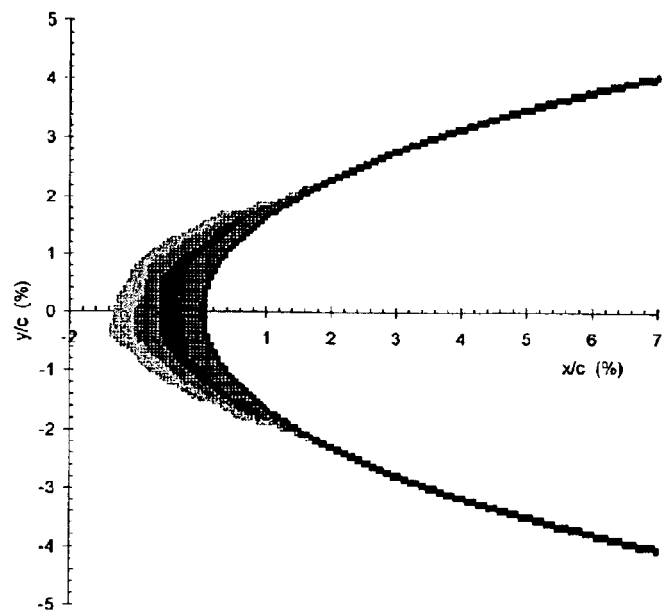
FIG. 9b shows the morphogenetic model.

The four solid lines in FIG. 9a depict the ice accretion shape for a total incoming water mass of 5, 10, 15 and 20 kg m$^{-2}$. The morphogenetic model simulation for the same conditions is shown in FIG. 9b. There is an overall agreement between the morphologies of both icing predictions. The morphogenetic model exhibits certain stochastic features of the ice structure such as roughness and a lack of perfect symmetry about the airfoil's horizontal axis of symmetry. The stochastic variability of the morphogenetic model's prediction is due to its underlying randomness.

Figure 10A:
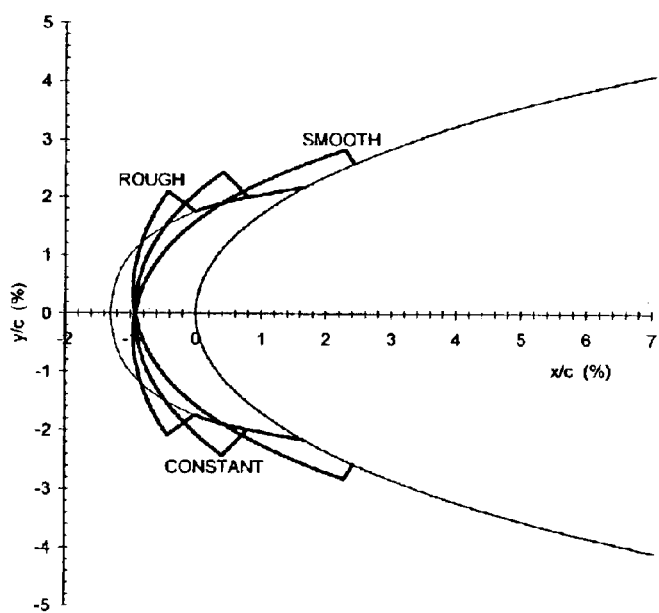
FIG. 10a shows an analytical model prediction for three heat transfer formulations: constant (homogeneous) Frössling number, smooth surface and rough surface. The thin solid line depicts the ice accretion when all impinging droplets freeze on impact.

When the runback factor exceeds unity, there is not enough heat removed at the stagnation line for all the impinging liquid to freeze, and water starts to flow downstream along the airfoil. The analytical model predictions for a runback factor of 1.4 and a total incoming water mass of 20 kg m$^2$ are displayed in FIG. 10a. The three thick curves represent ice shapes for the different heat transfer formulations. For comparison purposes, the final ice shape for the instantaneous freezing (dry icing) case is also shown and depicted by a thin curve. Since the runback factor is the same for all three heat transfer cases, the ice thickness at the stagnation line remains constant. This is because the runback factor is the ratio of the maximum ice thickness at the stagnation line to its actual value (see Eq. 23). Unfrozen water flows from the stagnation line along the upper and lower airfoil surfaces. Consequently, in this region, the analytical model prediction is solely determined by the heat balance equation, and the ice thickness follows the Frössling number given by Eq. 21. There is a discontinuity at the maximum runback location, since downstream from this point, the impinging droplets freeze instantly and the ice growth is determined by Eq. 17. Since the analytical model's ice shape calculations are based on the initial growth rate, the model predicts unrealistic ice formation behind the ice horns. The ice growth there should diminish with time due to the shadowing effect of the horns. The maximum runback location is a function of the heat transfer formulation (see FIG. 8), and this is reflected in the shape and extent of the ice accretion.

Figure 10B:
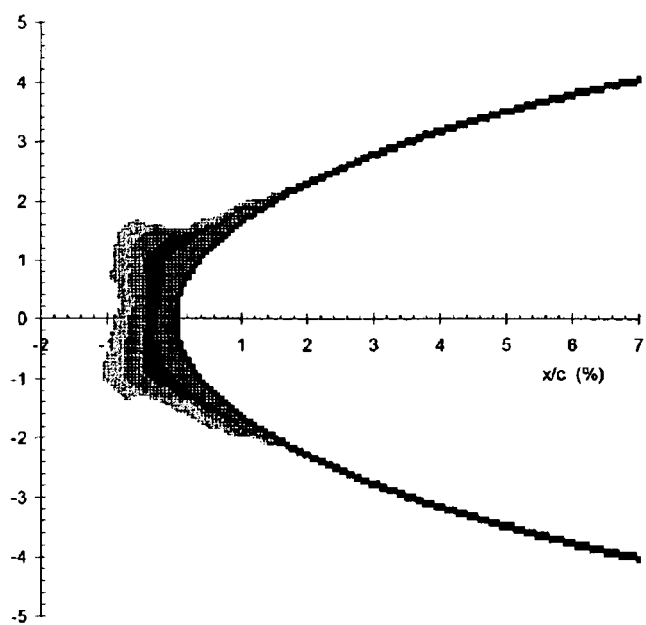
FIG. 10b shows a morphogenetic model simulation for constant Frössling number. Four consecutive ice layers are distinguished, each corresponding to an additional total water mass of 5 kg m−2.
Figure 10C:
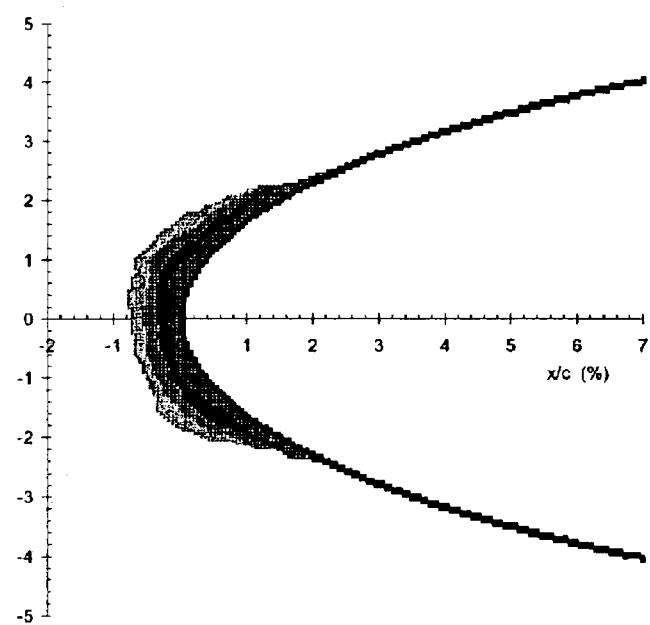
FIG. 10c shows a morphogenetic model simulation for a smooth surface.
Figure 10D:
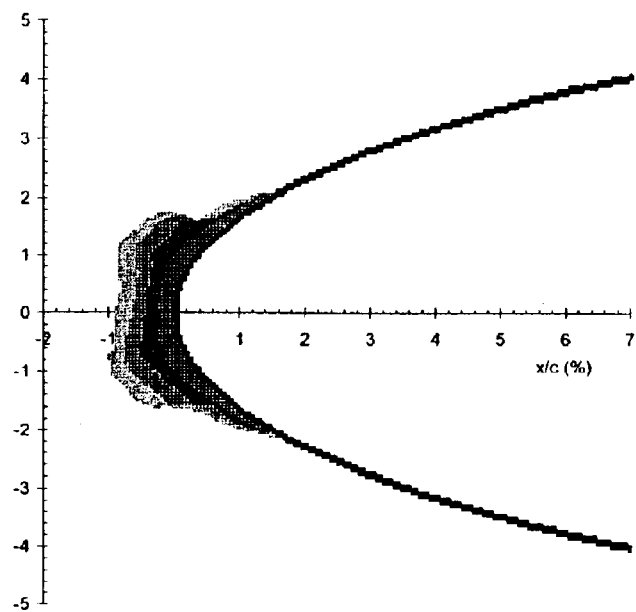
FIG. 10d shows a morphogenetic model simulation for a rough surface.

The morphogenetic model results for the three heat transfer formulations are shown in FIGS. 10b, 10c, and 10d. To show the time evolution of the accretion, four consecutive ice layers are depicted. For homogeneous heat transfer conditions, FIG. 10b, the ice thickness is approximately constant in the runback region. Downstream from the maximum runback location, impinging droplets freeze instantly and the resultant ice thickness reflects the distribution of the collection efficiency. While there is an overall agreement between the two models, the morphogenetic model better emulates the time-dependent features.

For the smooth surface formulation, FIG. 10c, the water flows over the entire ice surface and the whole ice shape is governed by the distribution of the Frössling number. For the case of a rough surface, FIG. 10d, the maximum ice thickness develops downstream from the stagnation line, leading to ice horn formation. The ice thickness at the stagnation line and the overall ice shape and extent agree well with the analytical model prediction. However, the morphogenetic model simulates a time-dependent shadowing effect.

Figure 11A:
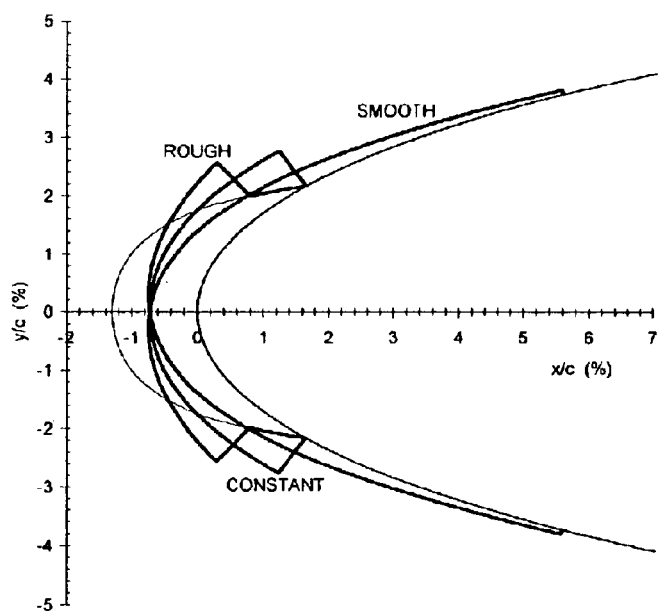
FIGS. 11a–11d correspond to those of FIG. 10 but for a runback factor of 1.8.

An increase of the runback factor is associated with less efficient water freezing, and this is reflected in an increasing extent of the ice accretion forming on the airfoil. The analytical model predictions for a runback factor of 1.8 are shown in FIG. 11a. The ice thickness at the stagnation line is the same for all three heat transfer cases, since the relation between the actual and maximum ice thickness at the stagnation line is given by the runback factor.

Figure 11B:
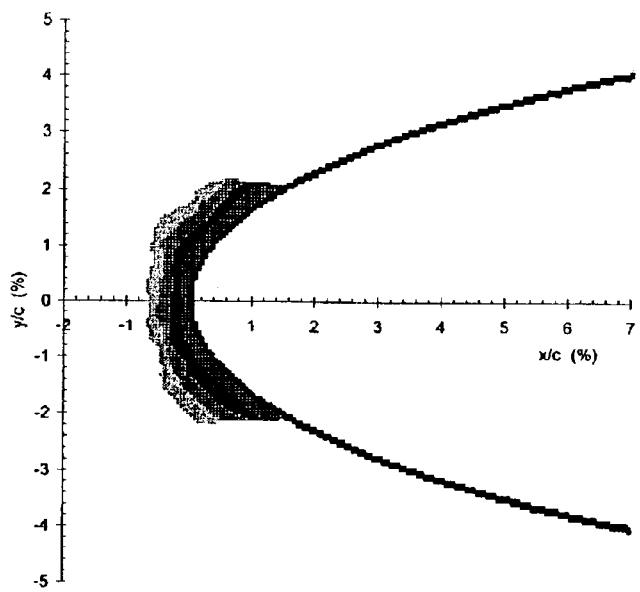
Figure 11C:
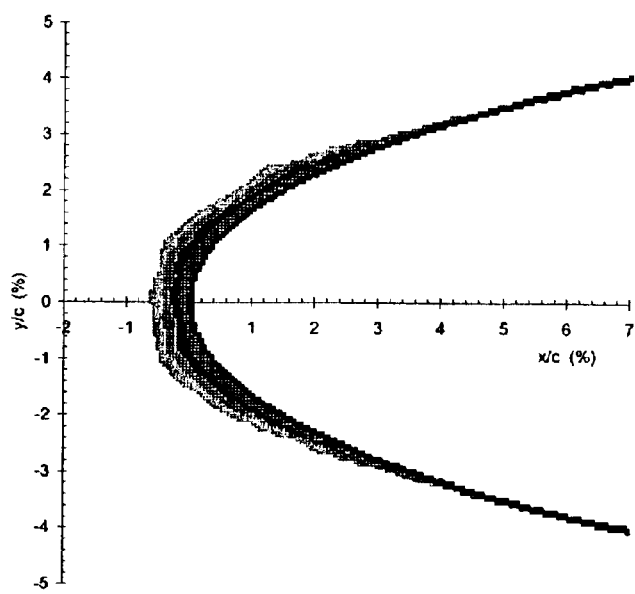
Figure 11D:
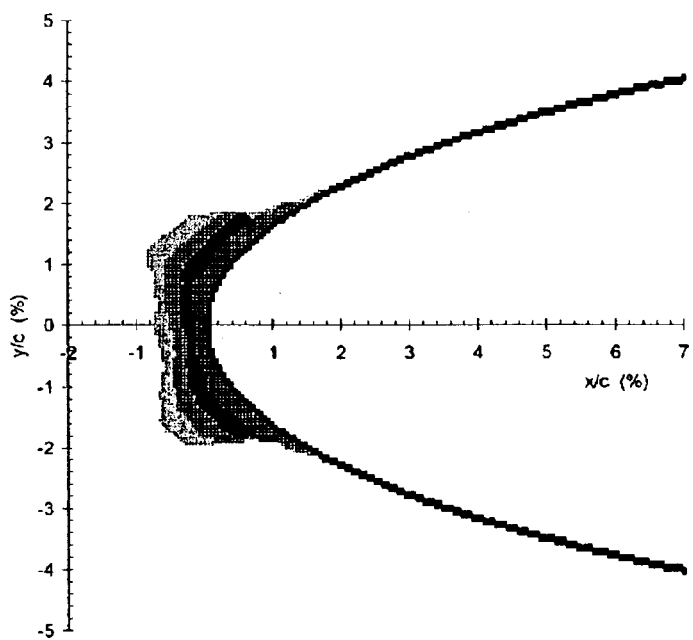

The maximum runback location is shown in FIG. 8, with the corresponding analytical ice shapes displayed in FIG. 11a. The time evolution of the ice shapes simulated by the morphogenetic model, for the three heat transfer formulations, is shown in FIGS. 11b, 11c, and 11d. When the heat transfer conditions are homogeneous, FIG. 11b, the ice thickness remains approximately constant along the airfoil. For the smooth surface, FIG. 11c, the ice thickness gradually decreases from a maximum value at the stagnation line. For the rough case, FIG. 11d, the thickness of the ice accretion along the airfoil initially increases then quickly diminishes to zero. A comparison of FIG. 11 with the corresponding FIG. 10 shows that an increase of the runback factor leads to a decrease of the ice thickness at the stagnation line, and to downstream displacement of the accretion's centre of mass.

Figure 12A:
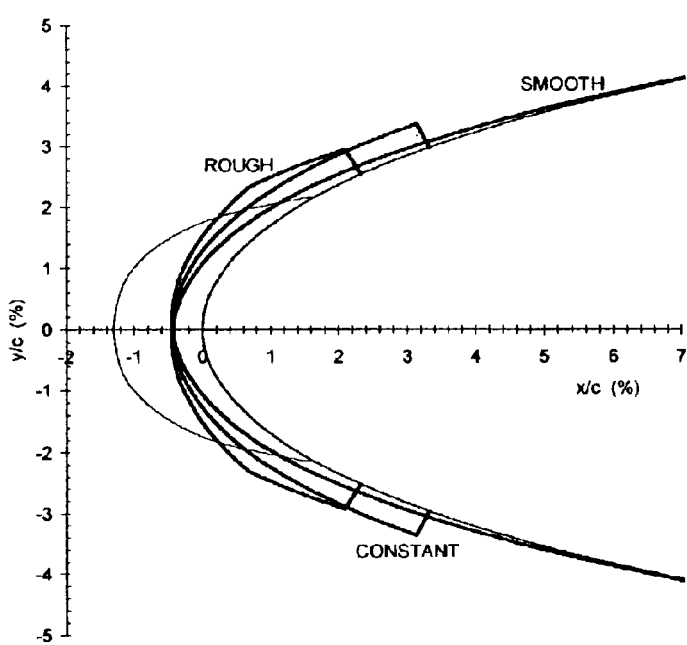
FIGS. 12a–12d correspond to those of FIG. 10 but for a runback factor of 3.0.
Figure 12B:
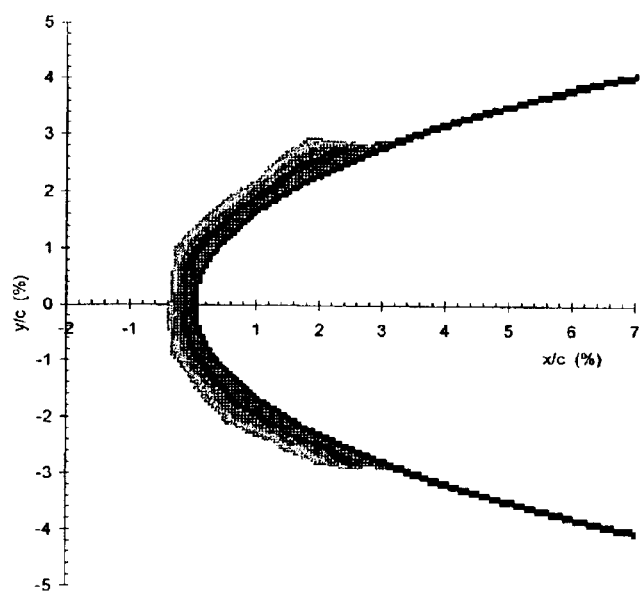
Figure 12C:
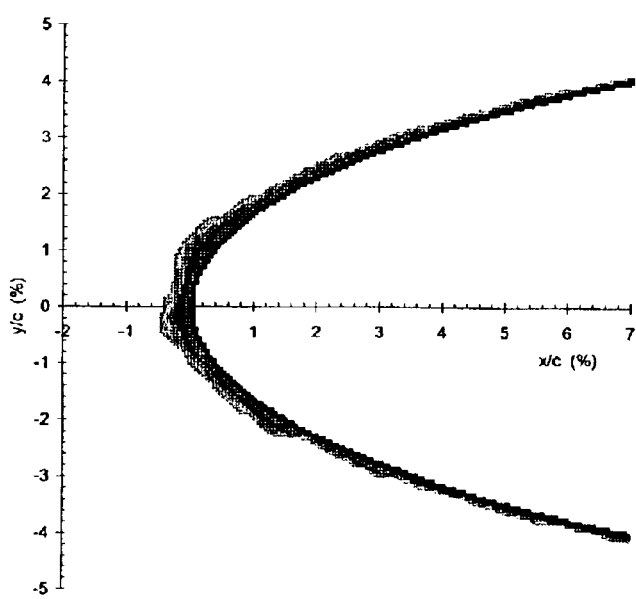
Figure 12D:
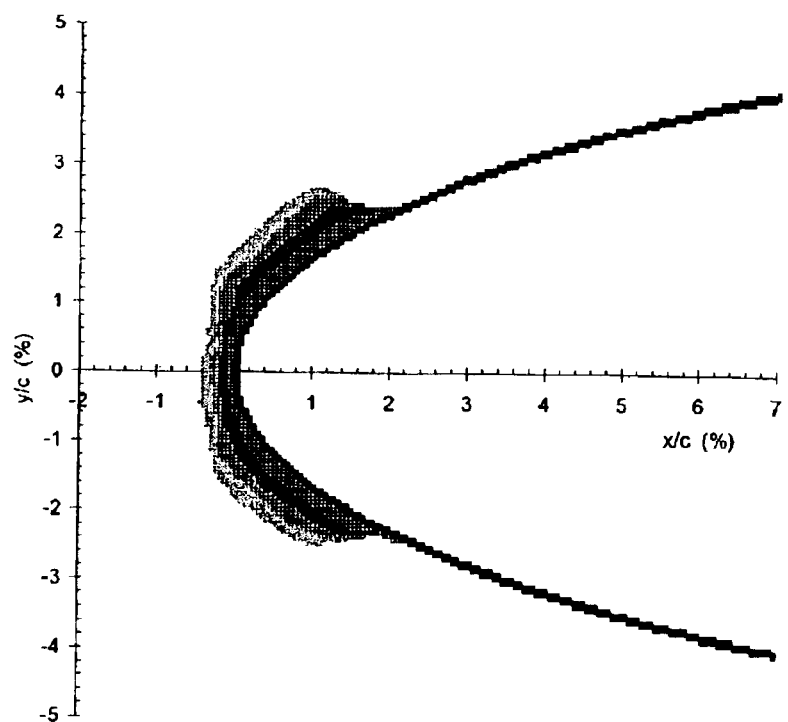

An even greater increase of the runback factor continues to decrease the overall ice thickness and to increase the ice accretion's extent. The analytical model prediction for a runback factor of 3 is shown in FIG. 12a. For the smooth surface, there is insufficient heat removed from the surface to freeze all the impinging water (see also FIG. 8). The analytical model predicts that only 63% of the impinging water mass freezes within the model domain depicted in the figures, while the rest leaves the domain. For homogeneous heat transfer, FIG. 12b, the morphogenetic model predicts an approximately constant ice thickness. For a smooth surface, FIG. 12c, the morphogenetic model predicts a gradual decrease of the ice thickness, while 68% of the impinging mass freezes inside the model domain. For the rough surface, both models predict a maximum ice thickness away from the stagnation line.

The morphogenetic model can simulate ice accretion on airfoils. The airflow, droplet trajectories, and the distribution of the convective heat transfer coefficient can be recalculated as the ice accretion evolves with time.

The morphogenetic model is a combination of a particle trajectory model, which determines the interception and impact location of fluid elements, and a random walk model, that emulates their motion and freezing along the airfoil or ice surface. The model fluid elements may be imagined to consist of an ensemble of cloud droplets, all of which undergo identical histories. A two-dimensional rectangular lattice defines the accretion domain, although extension to three dimensions is straightforward but computationally demanding. In principle, the morphogenetic model predicts and accounts for the time evolution of the accretion shape. Consequently, it can be particularly useful when simulating ice accretion on substrates of complex geometry, such as engine inlets and turbines.

The above results show that the morphogenetic model simulates ice accretion on an airfoil, in good agreement with an analytical model based on conservation of mass and heat balance equations. The morphogenetic model can simulate not only the initial ice growth, like the analytical model, but also the evolution of the accretion shape. However, the real power of the morphogenetic model for aircraft icing is that it can be applied to icing in complex three-dimensional geometries.

A significant feature of the model is that it allows the investigation of the stochastic variability of the accretion shape under constant external conditions. This allows calculations of error bars on the model predictions, something that cannot be achieved with existing continuous, deterministic models. Such error bars are helpful later when making comparisons with experimental results. The morphogenetic model can be used to simulate more accurately the time-dependent formation of ice accretion on airfoils, by recalculating the airflow, droplet trajectories, and the distribution of the convective heat transfer coefficient, as the ice accretion evolves with time.

Figure 13:
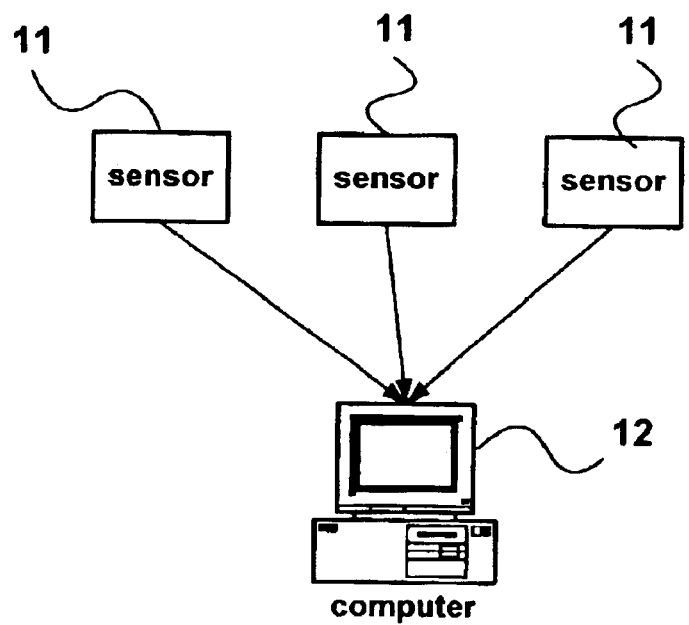
FIG. 13 illustrates a simple ice prediction system.

In a practical application of morphogenetic modelling, as shown in FIG. 13, sensors 10 continually monitor the significant parameters, namely airstream velocity, airstream liquid water content, droplet volume median diameter, altitude and air temperature. This data is digitized and fed into a computer 12 or signal processor to predict the expected ice growth on the airfoil surface based on the morphogenetic model described above. The results can be used to improve in-flight safety by giving the pilot warning of imminent icing conditions. The morphogenetic model can also be used to improve the design of airfoils.

A detailed discussion of in-flight icing phenomena and the applications of computational models is disclosed in R. J. Kind, M. G. Potapczuk, A. Feo, C. Golia, A. D. Shah, Experimental and Computational Simulation of in-flight Icing Phenomena, Progress in Aerospace Sciences 34 (1998) 257–345, the contents of which are herein incorporated by reference.

I claim:

1. A method of predicting icing on a surface in a fluid stream, comprising the step of:
    identifying predetermined macroscopic physical variables relevant to ice formation in a particular fluid environment;
    calculating the behaviour of individual fluid elements based on said identified macroscopic physical variables taking into account the effect on collision efficiency of non-linear droplet trajectories and the distribution of heat transfer over the surface; and
    predicting ice accretion based on the calculated behaviour of said individual fluid elements.

2. A method as claimed in claim 1, wherein said behaviour includes the freezing and shedding of said individual fluid elements.

3. A method as claimed in claim 2, wherein the behaviour of said individual fluid elements is assumed to be stochastic.

4. A method as claimed in claim 2, wherein said variables are selected from the group consisting of fluid stream velocity, fluid stream liquid water content, droplet volume median diameter, altitude and fluid temperature.

5. A method as claimed in claim 2, wherein step of calculating the behaviour of said individual fluid elements involves calculating the freezing probability thereof in said particular fluid environment.

6. A method as claimed in claim 5, wherein the accretion domain for said ice is defined by a lattice and the freezing probability at a location $\pi$ is calculated by determining the difference between a total upstream impinging mass of water $$\sum_{i=1}^{m} M_{WVi}$$

and a total upstream mass of frozen water $$\sum_{j=1}^{n-1} M_{Fj}.$$

7. A method as claimed in claim 6, wherein said lattice is a two-dimensional lattice.

8. A method as claimed in claim 6, wherein said lattice is a three-dimensional lattice.

9. A method as claimed in claim 5, wherrein said freezing probability is given by the expression $$P_n = \frac{1}{\frac{4}{\pi}\sum_{i=1}^{m} S_{i,n} - S_{1,n}\sum_{j=1}^{n-1}\frac{1}{S_{1,j}}} \text{ where}$$

$$S_{i,j} = \frac{m_{WVi}}{m_{Fj}}; \quad n = 1, 2, \ldots, n, ; m \leq n$$

10. A method as claimed in claim 5, wherein said freezing probability varies in a time-dependent manner.

11. A method as claimed in claim 2, wherein the behaviour of said individual fluid element is calculated successively for the total number of fluid elements in an intercepted mass flux.

12. A method as claimed in claim 11, wherein the distribution of freezing probability is recalculated after calculating the behaviour of each said fluid element.

13. A method as claimed in claim 1, wherein an azimuthal distribution of the heat transfer to the fluid stream is taken into account in the calculation of the behaviour of said individual fluid elements.

14. A method as claimed in claim 1, wherein said surface is an airfoil.

* * * * *